United States Patent
Li et al.

(10) Patent No.: US 12,226,963 B2
(45) Date of Patent: Feb. 18, 2025

(54) VACUUM INSULATION PANEL APPLICATION DEVICE AND METHOD

(71) Applicants: QINGDAO HAIER REFRIGERATOR CO., LTD., Qingdao (CN); HAIER SMART HOME CO., LTD., Qingdao (CN)

(72) Inventors: Xiaofeng Li, Qingdao (CN); Zhanzhan Liu, Qingdao (CN); Peng Li, Qingdao (CN); Kunkun Zhao, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 150 days.

(21) Appl. No.: 18/008,154

(22) PCT Filed: Dec. 18, 2020

(86) PCT No.: PCT/CN2020/137543
§ 371 (c)(1),
(2) Date: Dec. 2, 2022

(87) PCT Pub. No.: WO2021/212884
PCT Pub. Date: Oct. 28, 2021

(65) Prior Publication Data
US 2023/0278294 A1  Sep. 7, 2023

(30) Foreign Application Priority Data
Jun. 2, 2020 (CN) .......................... 202010488210.5

(51) Int. Cl.
*B29C 65/18* (2006.01)
*B29C 44/12* (2006.01)
(Continued)

(52) U.S. Cl.
CPC .............. *B29C 69/02* (2013.01); *B29C 44/12* (2013.01); *B29C 65/18* (2013.01); *B29C 65/565* (2013.01); *B29L 2031/7622* (2013.01)

(58) Field of Classification Search
CPC ....... B29C 69/02; B29C 65/18; B29C 65/565; B29C 44/12; B29C 44/14; B29C 44/367
(Continued)

(56) References Cited

U.S. PATENT DOCUMENTS

2020/0130240 A1    4/2020 Costanza et al.

FOREIGN PATENT DOCUMENTS

CN          101660648 A      3/2010
CN          204701251 U     10/2015
(Continued)

*Primary Examiner* — James D Sells
(74) *Attorney, Agent, or Firm* — Cheng-Ju Chiang

(57) ABSTRACT

A vacuum insulation panel application device and method are provided. The device comprises a conveying platform for conveying a refrigerator housing, a foaming material spray gun head, a vacuum insulation panel placer and a press-fitter for pasting a vacuum insulation panel onto the refrigerator housing, wherein the foaming material spray gun head, the vacuum insulation panel placer and the press-fitter are sequentially arranged in the moving direction of the conveying platform; the spray gun head is fixedly arranged beside the conveying platform; and the press-fitter is provided with rollers for rolling the vacuum insulation panel.

7 Claims, 1 Drawing Sheet

(51) Int. Cl.
*B29C 65/56* (2006.01)
*B29C 69/02* (2006.01)
*B29L 31/00* (2006.01)

(58) Field of Classification Search
USPC .......................................................... 156/60
See application file for complete search history.

(56) References Cited

FOREIGN PATENT DOCUMENTS

| | | | | |
|---|---|---|---|---|
| CN | 107178956 A | 9/2017 | | |
| CN | 108582307 A | 9/2018 | | |
| DE | 102012001372 A1 | 7/2013 | | |
| EP | 3112115 A1 * | 1/2017 | ............. | B29C 33/20 |

* cited by examiner

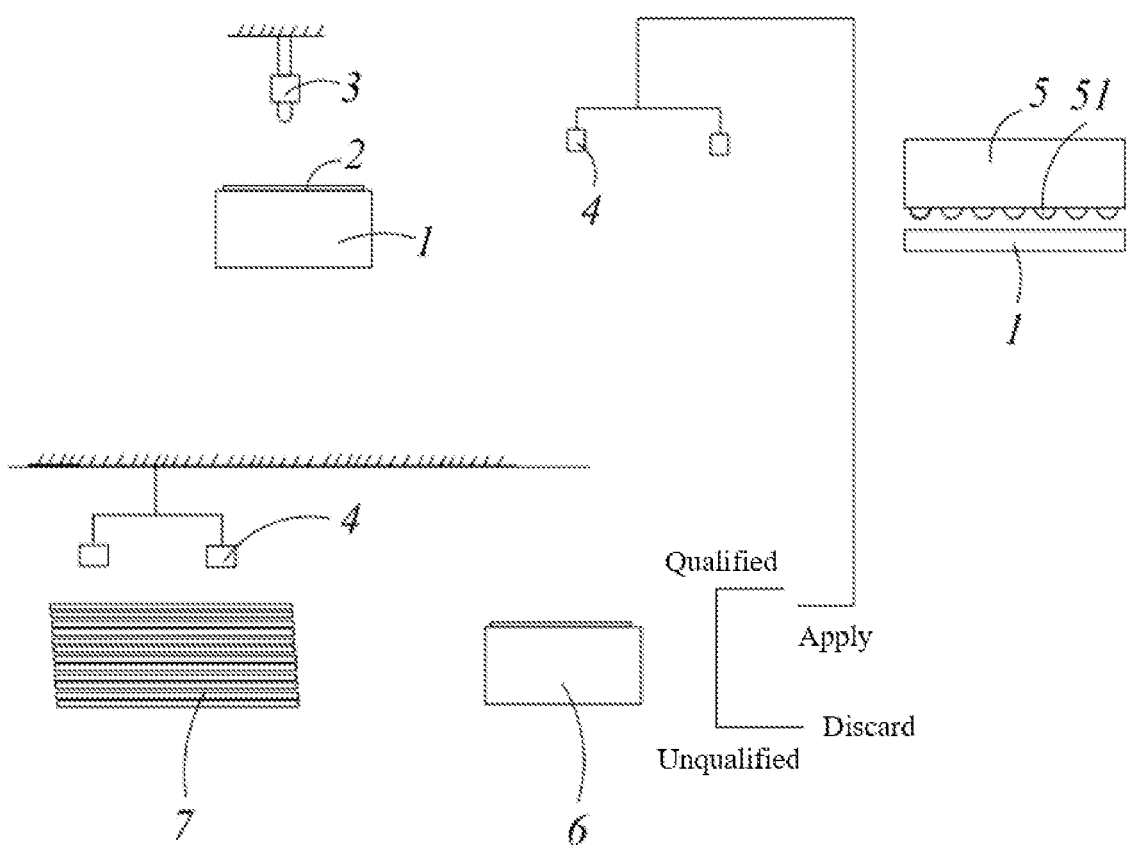

VACUUM INSULATION PANEL APPLICATION DEVICE AND METHOD

CROSS REFERENCE TO RELATED APPLICATIONS

This application is a 35 U.S.C. § 371 National Phase conversion of International (PCT) Patent Application No. PCT/CN2020/137543, filed on Dec. 18, 2020, which claims priority to Chinese Patent Application No. 202010488210.5, filed on Jun. 2, 2020, the disclosure of which is here incorporated by reference in its entirety. The PCT International Patent Application was filed and published in Chinese.

TECHNICAL FIELD

The present invention relates to a vacuum insulation panel application device and method, and particularly to a vacuum insulation panel application device and method which may improve the application efficiency.

BACKGROUND

At present, a device for applying a vacuum insulation panel to a refrigerator housing usually comprises: a conveying platform for conveying a refrigerator housing, a spray gun head located above the conveying platform and configured to spray a foaming material, a pick-and-place mechanism for picking up and placing the vacuum insulation panel, and a press-fitting mechanism for adhering the vacuum insulation panel on the refrigerator housing, the spray gun head, pick-and-place mechanism, and the press-fitting mechanism are disposed in turn in a movement direction of the conveying platform. However, the spray gun head is of a movable type; the refrigerator housing stops when moving to a position below the spray gun head, the spray gun head movably sprays the foaming material, then the refrigerator housing continues to move to the pick-and-place mechanism and stops, the pick-and-place mechanism places the vacuum insulation panel on the refrigerator housing, and the refrigerator housing continues to move to the press-fitting mechanism. However, the press-fitting mechanism is usually a flat panel structure, and the refrigerator housing must stop again upon moving to the press-fitting mechanism. Therefore, in the whole vacuum insulation panel applying process, the refrigerator housing needs to stop totally three times, which substantially reduces the application efficiency of the vacuum insulation panels.

In view of the above problem, it is necessary to improve the conventional vacuum insulation panel application device and method, to solve the above problem.

SUMMARY

The present invention provides a vacuum insulation panel application device and method with a higher application efficiency.

The present invention is directed to a vacuum insulation panel application device, wherein the vacuum insulation panel applying device comprises a conveying platform for conveying a refrigerator housing, a foaming material spray gun head, a vacuum insulation panel placer, and a press-fitter for adhering the vacuum insulation panel on a refrigerator housing, the foaming material spray gun head, the vacuum insulation panel placer and the press-fitter are sequentially arranged in a moving direction of the conveying platform, the foaming material spray gun head is fixedly disposed beside the conveying platform, and the press-fitter has rollers for rolling the vacuum insulation panel.

Further, the press-fitter has a pair of first side walls arranged oppositely and extending in a widthwise direction of the conveying platform, a pair of second side walls extending in a lengthwise direction of the conveying platform, and a top wall connecting the first side walls and the second side walls, and the rollers are pivotally connected between the second side walls.

Further, the press-fitter further has a heating element disposed on an inner wall of the top wall.

Further, a distance between the first side walls is 1-2 times the length of the refrigerator housing.

Further, the vacuum insulation panel applying device further comprises a detection platform for detecting performance of the vacuum insulation panel before being placed.

The present invention is also directed to method for applying a vacuum insulation panel, wherein the method comprises the following steps:

placing a refrigerator housing on a conveying platform;

when the refrigerator housing moves along with the conveying platform to a foaming material spraying station, a spray gun head gradually sprays the foaming material toward an application region of the refrigerator housing as the conveying platform moves the refrigerator housing;

conveying the refrigerator housing with the foaming material to a vacuum insulation panel placing station, a vacuum insulation panel placer picking up the vacuum insulation panel and placing it on the application region of the refrigerator housing;

conveying the refrigerator housing provided with the vacuum insulation panel to a pressing station, a press-fitter gradually rolling the vacuum insulation panel as the conveying platform conveys the refrigerator housing, so that the vacuum insulation panel is applied to the refrigerator housing.

Further, before picking up and placing the vacuum insulation panel on the application region of the refrigerator housing, the vacuum insulation panel placer first places the vacuum insulation panel on a detection platform for detection, and then places the vacuum insulation panel on a foaming material spraying position of the refrigerator housing after the vacuum insulation panel is detected qualified, or performs discarding processing when the vacuum insulation panel fails to pass the detection, and then picks up next vacuum insulation panel for detection.

Further, a time range for the refrigerator housing in the press-fitter is 5-10 s.

Further, when the refrigerator housing enters the press-fitter, a heating element in the press-fitter starts to operate and control a temperature within a range of 35-50° C.

As compared with the prior art, the advantageous effects of the present invention are as follows: in the vacuum insulation panel applying device of the present invention, the spray gun head is fixedly disposed beside the conveying platform, and the press-fitter has rollers for rolling the vacuum insulation panel. In this way, it can be ensured that in the process of applying the vacuum insulation panel to the refrigerator housing, the spraying station and the pressing station always remain in the moving state, thereby greatly improving the application efficiency of the vacuum insulation panel.

BRIEF DESCRIPTION OF THE DRAWINGS

The FIGURE is a schematic view of a vacuum insulation panel applying device according to the present invention.

DETAILED DESCRIPTION

In order to make those skilled in the art better understand the technical solutions of the present invention, the technical solutions in the embodiments of the present invention will be clearly and completely described below with reference to figures in the embodiments of the present invention. Obviously, the described embodiments are only partial embodiments of the present invention, but not all embodiments. Based on the embodiments of the present invention, all other embodiments obtained by those having ordinary skill in the art without making creative efforts should fall within the protection scope of the present invention.

Referring to the FIGURE, an embodiment of a vacuum insulation panel applying device according to the present invention is illustrated. The vacuum insulation panel applying device comprises a conveying platform 1, a spray gun head 3 configured to spray a foaming material, a vacuum insulation panel placer 4, and a press-fitter 5 for adhering the vacuum insulation panel on a refrigerator housing 2. The foaming material spray gun head 3, the vacuum insulation panel placer 4 and the press-fitter 5 are disposed in turn in a movement direction of the conveying platform 1. The spray gun head 3 is fixedly disposed beside the conveying platform 1 (or is hung above the conveying platform), and the press-fitter 5 has rollers 51 for rolling the vacuum insulation panel.

Specifically, the vacuum insulation panel applying device mainly comprises three stations, namely, a foaming material spraying station, a vacuum insulation panel placing station and a vacuum insulation panel applying station (briefly referred to as a spraying station, a placing station and a pressing station). In the present embodiments, the conveying platform 1 has a fixed frame and a conveying mechanism disposed on the fixed frame. The conveying mechanism is a conveyor belt. Certainly, the conveying mechanism may also be a roller structure. The vacuum insulation panel applying device further has a control module and a position sensor (not shown) disposed on the fixed frame and configured to sense a position of the refrigerator housing 2 in real time.

In the present embodiment, a bracket is also disposed above the conveying platform 1, the vacuum insulation panel placer 4 is disposed on the bracket, and the vacuum insulation panel placer 4 is fixed to a link which is on the bracket and whose height is adjustable. The placing station further has a detection platform 6 for detecting the vacuum insulation panel. The vacuum insulation panel placer 4 is a mechanical suction cup such as a vacuum suction cup. The suction cup is provided with vents. When the suction cup is located on the surface of the vacuum insulation panel, air is evacuated to firmly suck the vacuum insulation panel.

The mechanical suction cup first sucks the vacuum insulation panel from a stack 7 to above the detection platform 6 for detecting a thermal conductivity of the vacuum insulation panel; when the vacuum insulation panel is detected qualified, the mechanical suction cup sucks and places the vacuum insulation panel to an application region on the refrigerator housing 2. When the vacuum insulation panel is detected unqualified, the suction cup will perform discarding processing. The mechanical suction cup sucks a new vacuum insulation panel from the stack 7 and places it on the detection platform 6 for detection until a vacuum insulation panel is detected qualified.

Although most of the vacuum insulation panels have undergone qualification detection during production, the vacuum insulation panels are not used for the process of producing the refrigerator housing 2 immediately after they are shipped out of the factory, and usually they are used after a period of time. Therefore, with the detection platform 6 for detecting the vacuum insulation panels being arranged, the vacuum insulation panels can be further ensured, and the yield rate of products be improved.

In the present embodiment, the press-fitter 5 has a pair of first side walls arranged oppositely, a pair of second side walls arranged oppositely, and a top wall connecting the first side walls and the second side walls. The pair of first side walls are disposed extending in a width direction of the conveying platform 1, the pair of second side walls are disposed extending in a length direction of the conveying platform 1, and the rollers 51 are pivotally connected between the second side walls.

In the present embodiment, the press-fitter 5 further has a heating element (not shown) disposed on an inner wall of the top wall. Therefore, the heat provided by the heating element is located in a space formed by the first side walls, the second side walls, the top wall and the rollers 51, does not easily spread towards the external, and facilitates the application of the vacuum insulation panel and the foaming of the foaming material. Certainly, in other embodiments, the heating element may also be disposed on the inner wall of the first side wall or the inner wall of the second side wall, or disposed on the inner walls of the first side wall, the second side wall and the top wall, to ensure that the temperature in the space of the pressing device is more uniform.

In the present embodiment, the press-fitter 5 is fixedly disposed on the conveying platform 1. Certainly, in other embodiments, the press-fitter 5 may also be hung above the conveying platform 1.

In the present embodiment, a length of the press-fitter 5 is 1-2 times the length of the refrigerator housing 2, that is, a distance between the first side walls is 1-2 times the length of the refrigerator housing 2. As such, the refrigerator housing 2 can be ensured to be located in the press-fitter 5 for a period of time to ensure the normal foaming of the foaming material and the optimal application effect of the vacuum insulation panel, and the size of the press-fitter 5 can also be controlled to save space and cost. With the configuration in which the rollers 51 are disposed in the press-fitter 5, the refrigerator housing 2 may be ensured always in a moving state to complete the application process of the vacuum insulation panel, and the application efficiency of the vacuum insulation panel may be greatly improved.

In the present embodiment, a method for applying the vacuum insulation panel specifically comprises the following steps:

placing the refrigerator housing 2 on the conveying platform 1; certainly, the refrigerator housing 2 may also be conveyed from a previous refrigerator housing 2 production tooling.

When the refrigerator housing 2 moves with the conveying platform 1 to the foaming material spraying station, the spray gun head 3 gradually sprays the foaming material toward the application region of the refrigerator housing 2 as the conveying platform 1 moves the refrigerator housing 2; in this process, the position of the refrigerator housing 2 may be monitored in real time by the position sensor on the conveying platform 1, and the control module controls the spray gun head 3 to spray and finish spraying according to the position. Furthermore, in this process, the refrigerator housing 2 still remains in a state of moving towards the next station.

Specifically, the application region has front and rear ends. When the front end of the application region is monitored, spraying starts, and when the rear end of the application region is detected, the spraying ends and the vacuum insulation panel enters the placing station. In this process, the refrigerator housing 2 always remains in a moving state, which greatly improves production efficiency.

The refrigerator housing 2 with the foaming material is conveyed to the vacuum insulation panel placing station, and the vacuum insulation panel placer 4 picks up the vacuum insulation panel and places it on the application region of the refrigerator housing 2; In this process, before picking up and placing the vacuum insulation panel on the foaming material spraying station of the refrigerator housing 2, the vacuum insulation panel placer 4 first places the vacuum insulation panel on the detection platform 6 for detection, and then places the vacuum insulation panel on a foaming material spraying position of the refrigerator housing 2 after the vacuum insulation panel is detected qualified. When the vacuum insulation panel fails to pass the detection, the vacuum insulation panel placer 4 performs discarding processing and picks up next vacuum insulation panel for detection.

Certainly, the control module may further control the refrigerator housing 2 to start the detection of the vacuum insulation panel before entering the station according to the moving speed of the refrigerator housing 2, the detection speed of the vacuum insulation panel and the speed at which the vacuum insulation panel is placed on the refrigerator housing 2, thereby improving the operation efficiency.

After the vacuum insulation panel is placed in the foaming material application region of the refrigerator housing 2, the refrigerator housing 2 provided with the vacuum insulation panel is conveyed to the pressing station, and the press-fitter 5 gradually rolls the vacuum insulation panel as the conveying platform 1 conveys the refrigerator housing 2, so that the vacuum insulation panel is applied to the refrigerator housing 2.

The refrigerator housing 2 remains in the moving state in the press-fitter 5, the rollers 51 in the press-fitter 5 rolls the vacuum insulation panel, and meanwhile the foaming material completes the foaming process at a suitable temperature in the press-fitter 5 until the refrigerator housing 2 completely leave the press-fitter 5. In this process, a time range for the refrigerator housing 2 in the press-fitter 5 is 5-10 s, and the temperature in the press-fitter 5 is controlled within a range of 35-50° C.

In the present embodiment, the conveyor belt is a continuous structure. Therefore, it is necessary to control the distance between the previous refrigerator housing 2 and the next refrigerator housing 2 or control a time duration in which the next refrigerator housing 2 is placed on the conveying platform 1, thereby ensuring the normal application of the vacuum insulation panel to the previous refrigerator hosing 2.

Specifically, when the refrigerator housing 2 is moved from the spraying station to the placing station, the conveyor belt stops working. At this time, it should be ensured that there is no refrigerator housing 2 at the spraying station and the pressing station. Or put it any way, when the process of pressing the vacuum insulation panel to the current refrigerator housing 2 is completed at the pressing station, the next refrigerator housing 2 enters the spraying station.

Certainly, in other embodiments, the conveyor belt may be a structure with three sections which respectively correspond to the spraying station, the placing station and the pressing station. Specifically, when the refrigerator housing 2 completes the process at the spraying station, the vacuum insulation panel may be conveyed by the conveyer belt at the spraying station to the conveyor belt at the placing station. After the process at the placing process is completed, the vacuum insulation panel is conveyed by the conveyor belt at the placing station to the conveyor belt at the pressing station.

Furthermore, each conveyor belt is individually controlled, that is, when the conveyor belt at the placing station stops, the conveyor belts at the spraying station and the pressing station still remain in the moving state. In this way, it is not necessary that next refrigerator housing 2 starts the process at the spraying station only after the current refrigerator housing completes all processes.

That is to say, there is a refrigerator housing 2 at each station for a corresponding process. As such, the application efficiency of the vacuum insulation panel can be improved. Since the conveyor belt at the placing station needs to stop and continues to move only when the vacuum insulation panel is placed duly, the speed of the conveyor belt at the placing station can be properly adjusted to ensure simultaneous completion with the spraying station and the pressing station.

To conclude, in the vacuum insulation panel applying device of the present invention, the spray gun head 3 is fixedly disposed on the fixed frame on the conveying platform 1, and the press-fitter 5 has rollers 51 for rolling the vacuum insulation panel. In this way, it can be ensured that in the process of applying the vacuum insulation panel to the refrigerator housing 2, only the placing station stops once, and the remaining stations always remain in the moving state, thereby greatly improving the application efficiency of the vacuum insulation panel.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

So far, a person skilled in the art shall know that although a plurality of exemplary embodiments of the present invention have been described above in detail, various variations and improvements can be directly determined or deducted from the content disclosed by the present invention without departing from the spirit and scope of the present invention. Therefore, all those variations and improvements shall be deemed to be covered by the scope of the present invention.

What is claimed is:

1. A vacuum insulation panel application device, comprising:
   a conveying platform for conveying a refrigerator housing;
   a foaming material spray gun head;
   a vacuum insulation panel placer for taking and placing a vacuum insulation panel; and
   a press-fitter for adhering the vacuum insulation panel on the refrigerator housing;

wherein the foaming material spray gun head, the vacuum insulation panel placer and the press-fitter are sequentially arranged in a moving direction of the conveying platform, the foaming material spray gun head is fixedly disposed beside the conveying platform, and the press-fitter has rollers for rolling the vacuum insulation panel;

wherein the press-fitter has a pair of first side walls arranged oppositely and extending in a widthwise direction of the conveying platform, a pair of second side walls extending in a lengthwise direction of the conveying platform, and a top wall connecting the first side walls and the second side walls, and the rollers are pivotally connected between the second side walls, the vacuum insulation panel application device further comprises a detection platform for detecting performance of the vacuum insulation panel before being placed to a foaming material spraying position of the refrigerator housing, after the vacuum insulation panel is detected as being qualified, the vacuum insulation panel is placed on the foaming material spraying position for spraying, when the vacuum insulation panel fails to pass detection of the detection platform, a next vacuum insulation panel is then picked up for detection; the foaming material spray gun head gradually sprays foaming material toward an application region of the refrigerator housing as the conveying platform moves the refrigerator housing; and a position of the refrigerator housing is monitored in real time during spraying by a position sensor on the conveying platform, and a control module controls the foaming material spray gun head to spray and finish spraying according to the position of the refrigerator housing.

2. The vacuum insulation panel application device according to claim 1, wherein the conveying platform has a fixed frame and a conveying mechanism disposed on the fixed frame, and the position sensor disposed on the fixed frame and configured to sense the position of the refrigerator housing in real time.

3. The vacuum insulation panel application device according to claim 1, wherein the press-fitter further has a heating element disposed on an inner wall of the top wall.

4. The vacuum insulation panel application device according to claim 1, wherein a distance between the pair of first side walls is 1-2 times of a length of the refrigerator housing.

5. A method for applying a vacuum insulation panel, wherein the method comprises the following steps:
    placing a refrigerator housing on a conveying platform;
    spraying foaming material toward an application region of the refrigerator housing as the conveying platform moves the refrigerator housing along the conveying platform to a foaming material spraying station;
    conveying the refrigerator housing with the foaming material to a vacuum insulation panel placing station, a vacuum insulation panel placer picking up the vacuum insulation panel and placing the vacuum insulation panel on the application region of the refrigerator housing;
    conveying the refrigerator housing provided with the vacuum insulation panel to a pressing station, a press-fitter gradually rolling the vacuum insulation panel as the conveying platform conveys the refrigerator housing, so that the vacuum insulation panel is applied to the refrigerator housing;
    wherein before picking up and placing the vacuum insulation panel on the application region of the refrigerator housing, the vacuum insulation panel placer first places the vacuum insulation panel on a detection platform for detection, and then places the vacuum insulation panel on a foaming material spraying position of the refrigerator housing after the vacuum insulation panel is detected as being qualified, or, the vacuum insulation panel placer performs discarding processing when the vacuum insulation panel fails to pass the detection of the detection platform, and then picks up a next vacuum insulation panel for detection.

6. The method for applying a vacuum insulation panel according to claim 5, wherein a time range for the refrigerator housing in the press-fitter is 5-10 s.

7. The method for applying a vacuum insulation panel according to claim 5, wherein when the refrigerator housing enters the press-fitter, a heating element in the press-fitter starts to operate and control a temperature within a range of 35-50° C.

* * * * *